US010101984B1

United States Patent
Keen et al.

(10) Patent No.: US 10,101,984 B1
(45) Date of Patent: Oct. 16, 2018

(54) COGNITIVE MOBILE APP DEVICE RECOMMENDATION ENGINE

(71) Applicant: International Business Machines Corporation, Armonk, NY (US)

(72) Inventors: Martin G. Keen, Cary, NC (US); Brian M. O'Connell, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/496,089

(22) Filed: Apr. 25, 2017

(51) Int. Cl.
G06F 9/445 (2018.01)
G06F 8/61 (2018.01)
G06N 5/02 (2006.01)
H04L 29/08 (2006.01)

(52) U.S. Cl.
CPC ............... *G06F 8/61* (2013.01); *G06N 5/02* (2013.01); *H04L 67/34* (2013.01)

(58) Field of Classification Search
CPC .............. G06F 8/61; G06N 5/02; H04L 67/34
USPC .................................................. 717/174–178
See application file for complete search history.

(56) References Cited

U.S. PATENT DOCUMENTS

| | | | |
|---|---|---|---|
| 8,468,164 B1 | 6/2013 | Paleja et al. | |
| 2011/0296401 A1* | 12/2011 | DePoy | G06F 8/60 |
| | | | 717/174 |
| 2011/0307354 A1* | 12/2011 | Erman | G06F 8/60 |
| | | | 705/27.1 |
| 2013/0085886 A1* | 4/2013 | Satish | G06Q 30/02 |
| | | | 705/26.7 |
| 2013/0109357 A1 | 5/2013 | Ganatra et al. | |
| 2014/0114901 A1 | 4/2014 | Pradhan et al. | |
| 2016/0154641 A1 | 6/2016 | Kirkham et al. | |
| 2017/0318360 A1* | 11/2017 | Tran | G01L 5/0052 |

OTHER PUBLICATIONS

Youguo Pi et al., "Theory of Cognitive Pattern Recognition", 2008, in Pattern Recognition Techniques, Technology and Applications, ISBN 978-953-7619-24-4, InTech, Vienna, Austria, pp. 433-462.*
Wolfgang Woerndl et al., "A Hybrid Recommender System for Context-aware Recommendations of Mobile Applications", 2007, IEEE, pp. 871-878.*
Joon-Myung Kang et al., "Usage Pattern Analysis of Smartphones", Jun. 2014, retrieved from https://www.researchgate.net/publication/221106468 , 9 pages.*

(Continued)

*Primary Examiner* — Ted T Vo
(74) *Attorney, Agent, or Firm* — Edward J. Wixted, III

(57) ABSTRACT

Some embodiments of the present invention monitor and track usage patterns of various applications (apps) distributed among multiple mobile devices owned by a user. The data gathered during monitoring is stored in a mobile app usage repository. If the user considers installing a new app, a cognitive app analysis engine compares features and functionality of the new app against the usage patterns in the repository, to formulate recommendations as to which mobile device(s) the app should be installed on. The analysis engine provides its recommendations to the user, and may additionally perform automated installation of the app on the recommended device(s).

15 Claims, 4 Drawing Sheets

(56) References Cited

OTHER PUBLICATIONS

Philip Leroux et al., "Mobile Application Usage Prediction through Context-based Learning", Mar. 2013, retrieved from https://www.researchgate.net/publication/262371027 , 24 pages.*

Christoffer Davidsson, "Mobile Application Recommender System", Dec. 2010, Uppsala University, Sweden, pp. 1-56.*

Chirag Hingorani et al., "Personalized Recommender System for Smartphones based on Application Usage", Sep. 2014, International Journal of Advanced Research in Computer and Communication Engineering vol. 3, Issue 9, pp. 8070-8071.*

Hengshu Zhu et al., "Mobile App Recommendations with Security and Privacy Awareness", Aug. 2014, ACM, 10 pages.*

Hingorani et al., "Personalized Recommender System for Smartphones based on Application Usage", International Journal of Advanced Research in Computer and Communication Engineering vol. 3, Issue 9, Sep. 2014, Copyright to IJARCCE, 2 pages.

\* cited by examiner

COGNITIVE MOBILE APP DEVICE RECOMMENDATION ENGINE

BACKGROUND OF THE INVENTION

The present invention relates generally to the field of mobile electronic device applications (apps), and more particularly to the field of matching suitable devices with apps.

Computer software, also herein referred to as applications or mobile apps, today can be configured to run on one or more device types including, but not limited to the following: (i) a smart phone; (ii) a tablet computer; (iii) a smart watch; (iv) a smart television; (v) a media player; (vi) a "widget" that can run on the lock screen of a phone or tablet computer; (vii) a desktop computer or workstation; and/or (viii) a vehicle head unit or sound system. Apps perform wide-ranging functions including email, calendar, text, voice and/or video communication, navigation, computation, social networking, searching, image/video editing, and gaming, to name just a few, or any other type of computing application now known or to be developed in the future.

SUMMARY

According to an aspect of the present invention, there is a method, computer program product and/or system that performs the following operations (not necessarily in the following order): (i) collecting application usage pattern data with respect to a plurality of applications (apps) including a first app and a second app distributed non-exclusively over a plurality of devices operated by a user where the first app and the second app each has a respective functional classification, to produce an application-usage-pattern dataset; (ii) receiving a new-application dataset (a new-app dataset) with respect to a new application (new app) where the new app has a new-app functional classification; (iii) determining at least one similarity between information in the application-usage-pattern dataset and information in the new-app dataset; (iv) determining, based at least in part on the at least one similarity, an installation recommendation as to a first set of devices, of the plurality of devices, that the new app should be installed on; (v) sending the installation recommendation to a user interface; (vi) receiving user input; and (vii) on condition the user input indicates acceptance of the installation recommendation, installing the new app on the first set of devices.

DETAILED DESCRIPTION

Some embodiments of the present invention monitor and track usage patterns of various applications (apps) distributed among multiple mobile devices owned by a user. The data gathered during monitoring is stored in a mobile app usage repository. If the user considers installing a new app, a cognitive app analysis engine compares features and functionality of the new app against the usage patterns in the repository, to formulate recommendations as to which mobile device(s) the app should be installed on. The analysis engine provides its recommendations to the user, and may additionally perform automated installation of the app on the recommended device(s).

The present invention will now be described in detail with reference to the Figures.

Figure 1:
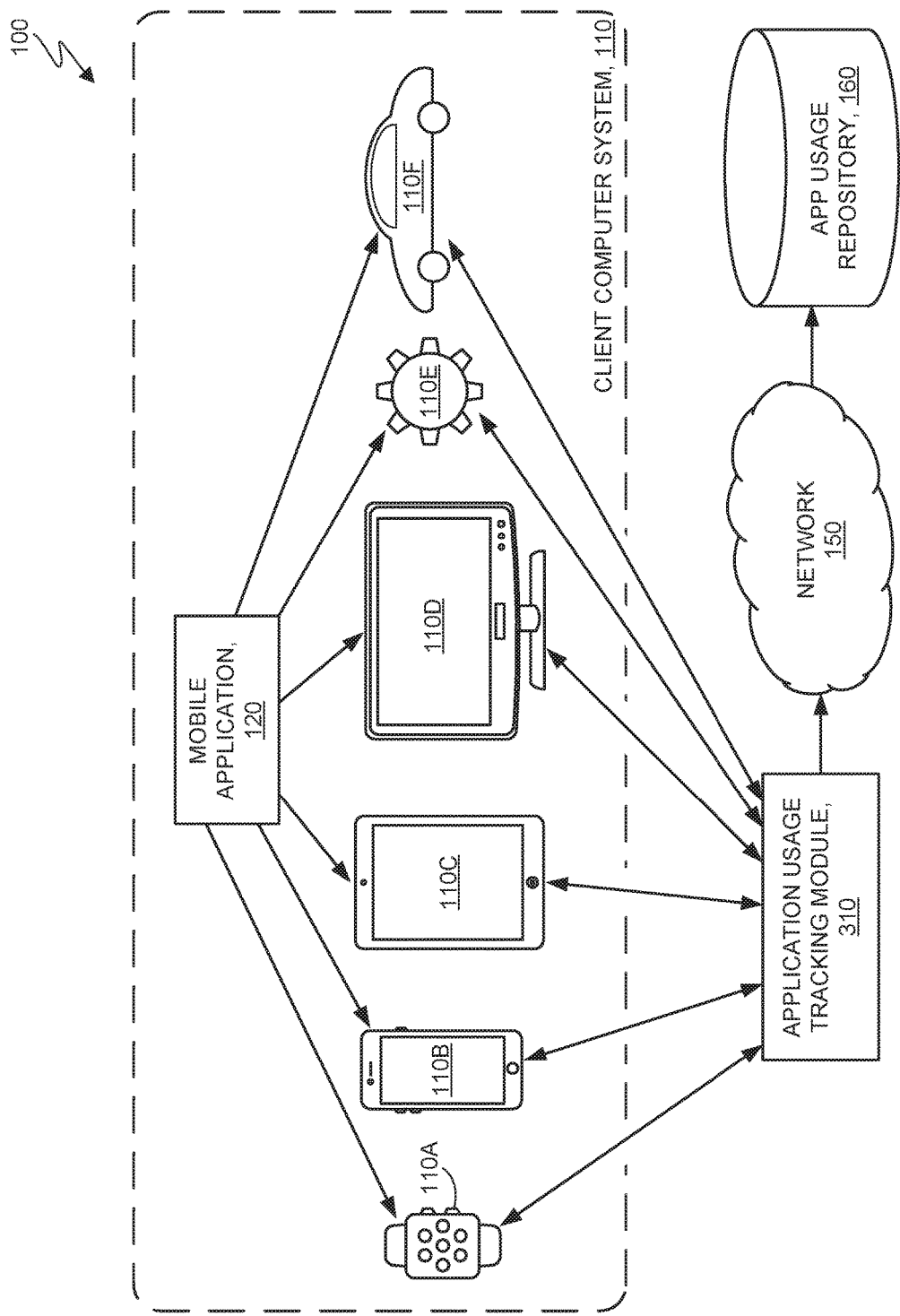
FIG. 1 is a functional block diagram depicting a computing environment in accordance with at least one embodiment of the present invention.

FIG. 1 is a functional block diagram depicting a computing environment 100 in accordance with an embodiment of the present invention. Computing environment 100 includes: client computer system 110; mobile application 120; communications network 150; app usage repository 160; and app usage tracking module 310. Client computer system 110 can include any of a desktop computer, laptop computer, specialized computer server, or any other computing device now known or to be developed in the future, such as: smart watch 110A; smart phone 110B; tablet computer 110C; smart TV 110D; widget 110E (software running on any computer system, for example on a lock-screen of a tablet computer); and/or head-unit 110F in an automobile. In some embodiments, client computer system 110 represents a computer system utilizing clustered computers and components to act as a single pool of seamless resources when accessed through communications network 150. In general, client computer system 110 is representative of any electronic device, or combination of electronic devices, capable of executing machine-readable program instructions, as described in greater detail with regard to FIG. 4.

Various computing device types (sometimes herein referred to as computing platforms) offer different experiences to the user, in both presentation and functionality. Some embodiments of the present invention help a user to select one or more devices are most appropriate for installation of a new app. A cognitive app analysis engine considers the context of the user's unique situation and compares it with features and functions of the new app. The engine recommends installing the new app on certain set of devices which the engine determines are likely to be compatible with the user's patterns of usage of other apps. An application installation module downloads and installs the new app on a set of user-selected devices, which may or may not be the same set of devices as recommended by the cognitive app analysis engine.

Some embodiments of the present invention may include one, or more, of the following features, characteristics and/or advantages: (i) collects, and stores in a repository, data pertaining to usage patterns of apps owned by a user, and usages patterns of devices on which the apps are used by the user; (ii) analyzes descriptions, release notes, screenshots, and/or videos with respect to a new app (in other words, analyzes available information pertaining to a new app that the user is considering for download/installation on one or more devices), to derive the presentation style and features offered by the new app, across multiple devices (such as phone, watch, tablet, TV, widget, car integration); (iii) analyzes a user's mobile app usage across various devices to derive the most appropriate set of devices to install the new mobile app onto, based on similar apps, similar app features, aggregate comparison with other mobile users, considerations for corporate devices, presence of companion apps and user centric factors such as interaction style, and predicted use cases; and/or (vi) monitor usage patterns and recommends apps for a user to download by taking into consideration the best platforms to install the apps onto. Some embodiments may not have these potential advantages and these potential advantages are not necessarily required of all embodiments.

Note: There is no clear distinction between a mobile device and a stationary device, and similarly between a mobile app and stationary app. Mobile vs. stationary distinctions are subject to different interpretations among different individuals, and further subject to changes over time. Whereas the terms "mobile app" and "mobile device" are used frequently herein, those terms are not intended to exclude stationary apps or stationary devices. Terms such as "mobile app", "app", "mobile application" and "application", etc., are herein used synonymously and interchangeably. The terms "mobile device" and "device", etc., are likewise herein used synonymously and interchangeably.

Example Embodiment

Figure 2:
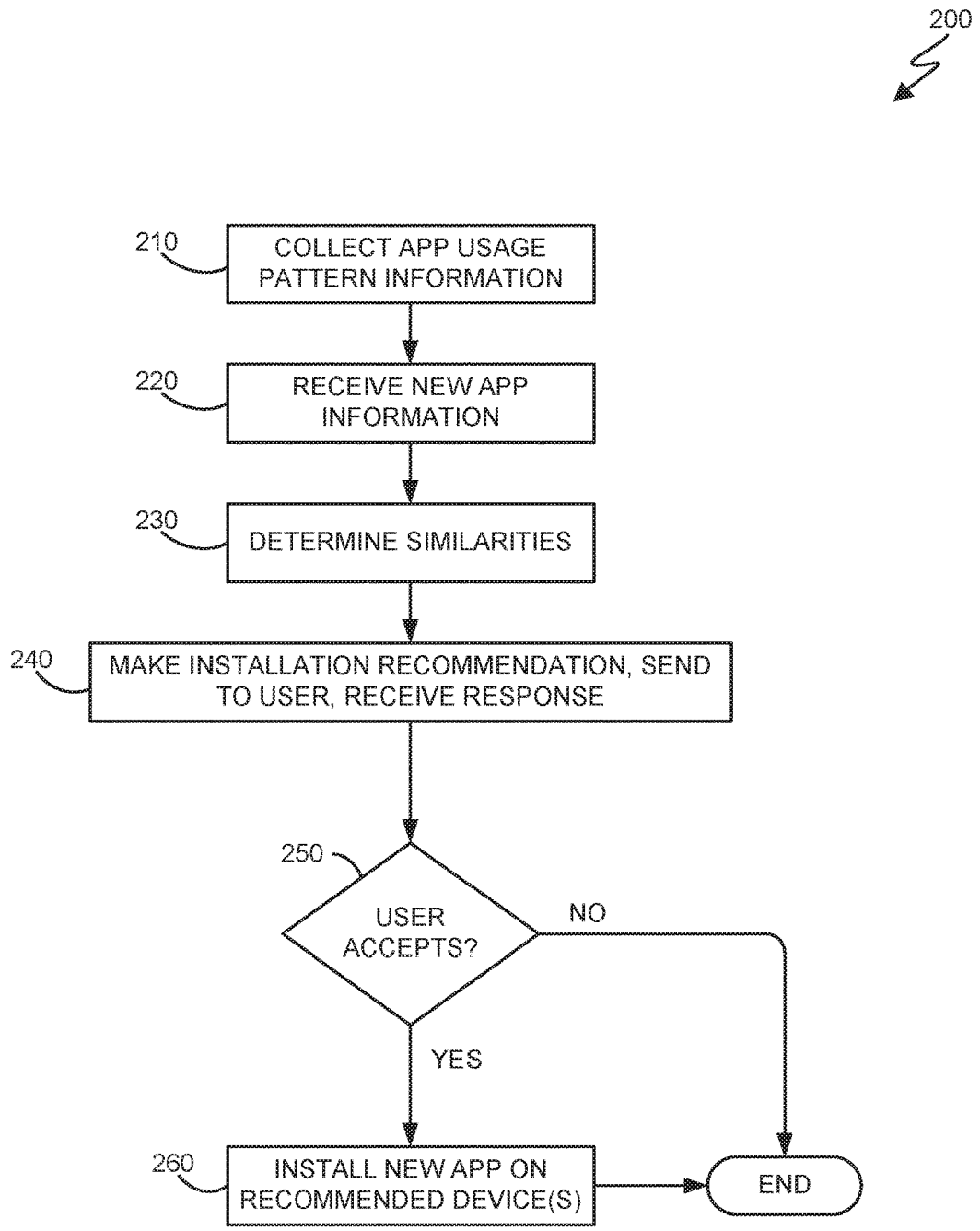
FIG. 2 is a flowchart showing a method performed in accordance with at least one embodiment of the present invention.
Figure 3:
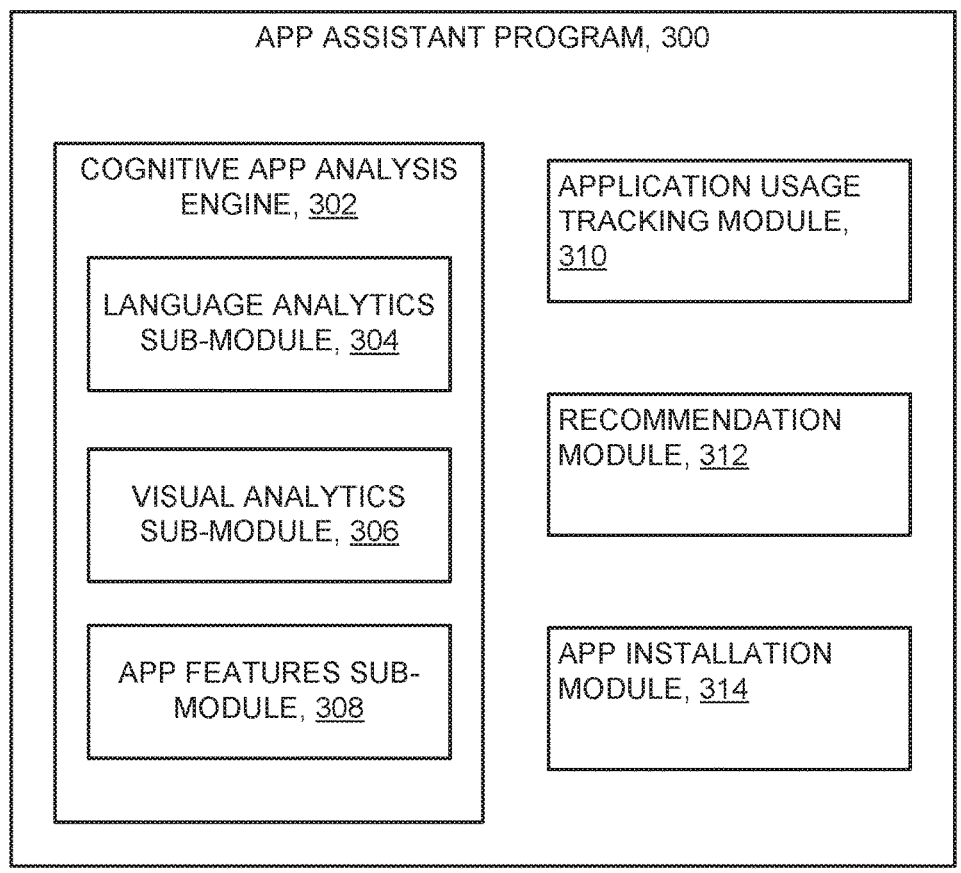
FIG. 3 is a block diagram showing a machine logic (for example, software) portion of a system in accordance with at least one embodiment of the present invention.

FIG. 2 shows flowchart 200 depicting a method according to the present invention. FIG. 3 shows app assistant program 300 for performing at least some of the method operations of flowchart 200. This method and associated software will now be discussed, over the course of the following paragraphs, with extensive reference to FIG. 2 (for the method operation blocks) and FIG. 3 (for the software blocks).

Processing begins at operation 210, where app usage tracking module 310 of app assistant program 300, collects application usage pattern data with respect to a user who uses multiple apps across multiple devices. The data includes many factors such as, but not limited to the following factors: (i) when (what times of the days, what days of week, etc.) an app is used; (ii) on which device(s) is the app used; (iii) with which other apps does the app interface; (iv) with what user interface (keyboard, touch screen, voice, etc.) does the user primarily interact with the app; and/or (v) what functions provided by the app does the user use, and with what frequency distribution, etc.

Processing proceeds at operation 220, where cognitive app analysis engine 302 receives information pertaining to a new app which the user is considering for installation on one or more of the user's devices.

Processing proceeds to operation 230 where language analytics sub-module 304, visual analytics sub-module 306 and application features sub-module 308, all of cognitive app analysis engine 302, interact with one another and app usage repository 160, to determine what similarities exist between apps currently on the user's devices and the new app. Factors considered including such factors as user interface, app features and functionality, which device(s) the various apps are installed on, and on which device(s) each app is most frequently used. More detailed information on how the cognitive analysis is performed in some embodiments, is provided with respect to Stages 2 and 3 under Further Comments And/Or Embodiments, below.

Processing proceeds to operation 240 where recommendation module 312 of app assistant program 300, determines a set of one or more devices to recommend to the user that the new app should be installed on, based on the analysis conducted in operation 230 above by the various sub-modules of cognitive app analysis engine 302. The recommendation module sends its recommendations to the user through a user interface of any device the user is operating. In some embodiments of the present invention, the recommendations are displayed in near real time on the same device with which the user explores information with respect to the new app.

Processing proceeds to operation 250 where the user accepts, rejects, or modifies the recommendations. If the user indicates acceptance (decision 250, "Yes" branch), app installation module 314 of app assistant program 300, installs the app on the recommended set of devices. If the user indicates rejection (decision 250, "No" branch), app installation module 314 takes no further action.

In some embodiments of the present invention (not shown in Flowchart 200), the user is presented with options to pick and choose on which devices the user prefers to install the new app. The options may be presented as a list of labelled check boxes respectively corresponding to the user's devices, where the recommended options are pre-selected. The user selects or de-selects the boxes as desired, and upon receiving user acceptance of the selections, app installation module 314 installs the new app on the selected devices.

Further Comments and/or Embodiments

Some embodiments of the present invention are implemented in four stages as follows: Stage 1—Mobile application usage tracking; Stage 2—Cognitive analysis of mobile application to download; Stage 3—Cognitive analysis of optimal device for mobile application; and Stage 4—Recommendation of devices. These stages will be discussed in the following paragraphs, with reference to FIGS. 1 and 3.

Stage 1: Mobile Application Usage Tracking

Application usage tracking module 310, of app assistant program 300, tracks (captures and stores usage data) with respect to how a user interacts with various mobile apps across various mobile devices. In some embodiments of the present invention, the application usage tracking module works with any device, mobile or stationary. It further works with any applications, mobile or not.

Application usage tracking module 310 requests and receives user consent to allow anonymous tracking of mobile app usage on each mobile device owned and/or controlled by the user. In some embodiments of the present invention, the user may select to include or exclude any or all of the user's devices for implementation of the present invention.

Application usage tracking module 310 monitors how the user interacts with various mobile apps across various platforms, by using software built into each of the user's mobile devices.

Application usage tracking module 310 tracks usage of devices such as, but not limited to, the following devices (refer to FIG. 1): (i) smart watch 110A; (ii) mobile phone 110B; (iii) tablet computer 110C; (iv) smart TV 110D; (v) widget 110E (for example an application that runs on the lock screen of a mobile device; (vi) vehicle 110F (such as a passenger vehicle capable of using a car radio or head unit to display and control a smart phone); and/or (vii) a desktop computer or workstation (not shown in FIG. 1).

Application usage tracking module 310 records at least the following information: (i) app launched—which mobile app is launched; (ii) app usage—which features of the mobile app are used; (iii) device—which device(s) the mobile app is used on; (iv) location—where the device is currently located and movement patterns of the device during app usage; and/or (v) dates and times when the mobile app is in use.

In some embodiments of the present invention, application usage tracking module 310 stores the information in app usage repository 160 which may reside in any storage system, such as in cloud storage. Information from far flung users and devices (the users consenting and participating in some embodiments of the present invention) flows into the app usage repository for aggregate analysis purposes.

Stage 2: Cognitive Analysis of Application

Cognitive app analysis engine 302 analyzes an application, when a user selects the app for exploratory information or download/installation, to gain information with respect to the app's presentation style, features and functions offered across each device platform.

In some embodiments of the present invention, cognitive app analysis engine 302 uses natural language processing and visual analytics to analyze the presentation and functionality of the selected mobile app (the new app). Using natural language processing, the cognitive engine analyzes at least the app description and release notes with respect to each supported device, platform and/or operating system, to ascertain the purpose of the app and features provided by the app. Using visual analytics, the engine analyzes at least screenshots and videos associated with the app, to ascertain the app's presentation style and features with respect to each platform. The cognitive engine further identifies the new app according to certain functional classifications including, but not limited to the following: (i) email; (ii) audio communications; (iii) video communications; (iv) textual communications; (v) navigation; (vi) calculation or computation; (vii) social networking; (viii) search engine; (ix) financial services; (x) web interaction (such as web browsing); (xi) operating system; (xii) security; and/or (xiii) file management, etc.

Stage 3: Cognitive Analysis of Optimal Device for Mobile App

In some embodiments of the present invention, data gathered, sought and/or produced by cognitive app analysis engine 302 include: (i) the user's device preference for similar apps; (ii) the user's device preference for similar features; (iii) device pairing; (iv) interaction style; (v) predicted use cases; (vi) aggregate comparison; (vii) corporate devices; and/or (viii) companion apps. The following few paragraphs provide discussion of the data items listed in this paragraph.

Stage 3(i)—User's Device Preference for Similar Apps—

Cognitive app analysis engine 302 may look for apps installed on the user's devices that are similar to the app under analysis. The engine analyzes in what ways, and more particularly on which device(s), the similar apps have been used. For example, suppose the user downloads a fitness app. The engine determines that the user has made most use of other fitness apps specifically on their smart watch and phone but does not use the app on their tablet, TV, car, or desktop computer.

Stage 3(ii)—User's Device Preference for Similar Features—

Cognitive app analysis engine 302 may compare features provided by the selected app to features of similar apps installed on the user's devices, to learn the user's device preferences with regard to the similar apps. For example for an app that offers a pedometer tracker, the user makes most use of this feature on their smart watch.

Stage 3(iii)—Device Pairing—

Cognitive app analysis engine 302 may determine pairing of devices the user owns to determine whether certain apps or types of apps are used on multiple devices or mainly on one device. For example, a global positioning (GPS) app for navigation may have multiple features that the user regularly uses across device types such as a smart phone, a smart watch, and an in-car app, whereas the user may use a hands-free phone dialing app strictly on a smartphone.

Stage 3(iv)—Interaction Style—

Cognitive app analysis engine 302 may compare the user interface of the app under analysis to that of similar apps on the user's devices, to ascertain the user's preferences. For example if the app supports voice input, the user may be more likely to use this feature at home on their TV or smart phone, but not in public on their phone. Some examples of a user interface characteristic that the cognitive app analysis engine may take into consideration for analysis include the following characteristics: (i) maximum display screen resolution; (ii) display screen size; (iii) input method (for example, text input, voice, touch screen, etc.); and/or (iv) output method (for example, audio, text display, graphic display, tactile feedback, etc.).

Stage 3(v)—Predicted Use Case—

Cognitive app analysis engine 302 may consider user-centric factors, to predict how a user is likely to use an app, based on past usage of other apps. For example, suppose a user wants to install a new social network photo-sharing app. If the user has used similar photo-sharing apps in the past to primarily take and post pictures, devices with a camera may be most appropriate for installation of the new app. In contrast, if the user has used photo-sharing apps in the past primarily to view pictures, devices with large screens such as a tablet and a TV may be most appropriate for installation of the new app.

Stage 3(vi)—Aggregate Comparison—

Cognitive app analysis engine 302 may analyze which devices are most popular with other users of the app under analysis. For example by analyzing app downloads and app review comments the cognitive app analysis engine may discover that the app is popular and well-received on phone and tablet devices, but is unpopular and/or poorly received on watch devices.

Stage 3(vii)—Corporate Devices—

Cognitive app analysis engine 302 may consider restrictions placed on corporate controlled devices, fitted for example with mobile device management (MDM) capabilities, to determine, based on the MDM policies, whether a given app is appropriate for installation on a corporate controlled device.

Stage 3(viii)—Companion Apps—

Cognitive app analysis engine 302 may consider the totality of apps which a user already has installed on each device to determine if a selected app would make a good companion app. For example if a user already has a photo-sharing app installed on a tablet computer, a companion app that allows photo editing may be well suited for installation on the tablet.

Stage 4: Device Recommendations

Some embodiments of the present invention perform the following actions with respect to an app which a user is considering for installation on one or more devices: (i) conduct an analysis with respect to Stage 3 as described above; (ii) based on the analysis, determine on which device(s) an application may be most suited to the user's devices and patterns of usage thereof; and/or (iii) present recommendations to the user, as to the device(s) the app (and/or particular features of the app) may be most useful, and/or convenient to the user and/or most suited the device(s) on which the app is installed.

In some embodiments of the present invention, an app that is installed on a particular device(s) is automatically downloaded onto other recommended devices. For example, an app selected for download and installation on a smart TV may also be automatically downloaded to a smart phone, but not other devices which were not recommended, for example a smart watch.

Figure 4:
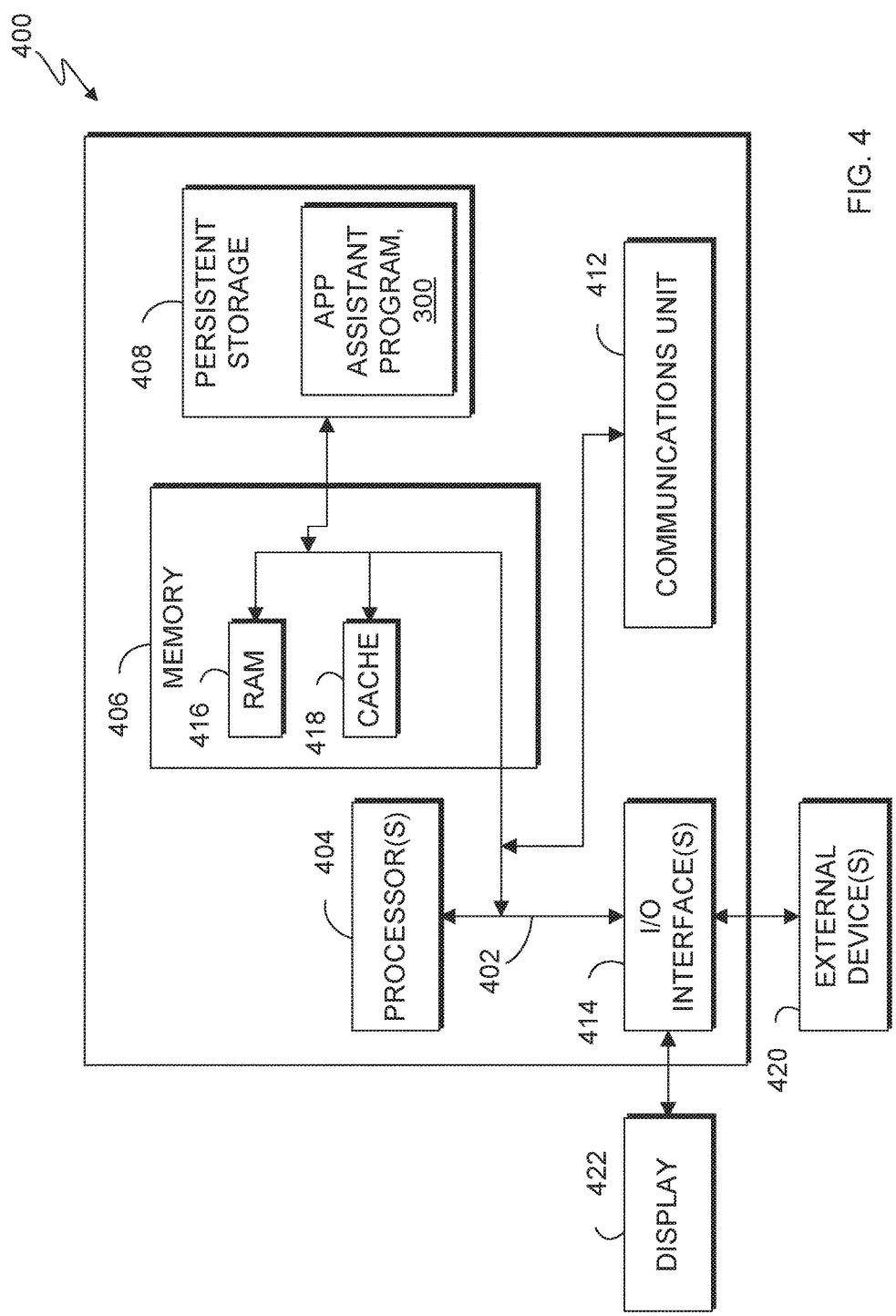
FIG. 4 is a block diagram depicting components of a computer, in accordance with at least one embodiment of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, input/output (I/O) interface(s) 414; and app assistant program 300. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method comprising:
    collecting application usage pattern data with respect to a plurality of applications (apps) including a first app and a second app distributed non-exclusively over a plurality of devices operated by a user where the first app and the second app each has a respective functional classification, to produce an application-usage-pattern dataset;
    receiving a new-application dataset (a new-app dataset) with respect to a new application (new app) where the new app has a new-app functional classification;
    determining at least one similarity between information in the application-usage-pattern dataset and information in the new-app dataset;
    determining, based at least in part on the at least one similarity, an installation recommendation as to a first set of devices, of the plurality of devices, that the new app should be installed on;
    sending the installation recommendation to a user interface;
    receiving user input; and
    on condition the user input indicates acceptance of the installation recommendation, installing the new app on the first set of devices.

2. The method of claim 1, wherein the application-usage-pattern dataset comprises one or more of the following types of information:
    a characteristic of a user interface of a first device;
    a usage pattern of the user interface of the first device;
    the classification of the first app;
    an operating feature of the first app on the first device;
    a function of the first app used by the user on the first device;
    an operating feature of the first app on a second device;
    a function of the first app used by the user on the second device;
    a first interaction between the first app on the first device, and the first app on the second device;
    a second interaction between the first app on the first device, and the second app on the first device; and
    a third interaction between the first app on the first device, and the second app on the second device.

3. The method of claim 1, wherein the new app-dataset comprises one or more of the following types of information:
    a user interface characteristic of the new app;
    an operating feature of the new app;
    a function of the new app;
    the classification of the new app;
    a type of device on which the new app is designed to operate; and
    a type of application with which the new app is designed to interact.

4. The method of claim 2, wherein the characteristic of the user interface of the first device includes at least one of the following characteristics:
- a maximum display screen resolution;
- a display screen size;
- an input method; and
- an output method.

5. The method of claim 1, wherein the respective functional classifications of the first app, the second app and the new app include one or more of the following functional classifications:
- email; audio communications; video communications; textual communications; navigation; calculation; social networking; search engine; financial services; web browsing; operating system; security; and file management.

6. A computer program product comprising:
- one or more computer readable storage media and program instructions stored on the one or more computer readable storage media, the program instructions comprising instructions to perform:
  - collecting application usage pattern data with respect to a plurality of applications (apps) including a first app and a second app distributed non-exclusively over a plurality of devices operated by a user where the first app and the second app each has a respective functional classification, to produce an application-usage-pattern dataset;
  - receiving a new-application dataset (a new-app dataset) with respect to a new application (new app) where the new app has a classification;
  - determining at least one similarity between information in the application-usage-pattern dataset and information in the new-app dataset;
  - determining, based at least in part on the at least one similarity, an installation recommendation as to a first set of devices, of the plurality of devices, that the new app should be installed on;
  - sending the installation recommendation to a user interface;
  - receiving a user input; and
  - on condition the user input indicates acceptance of the installation recommendation, installing the new app on the first set of devices.

7. The computer program product of claim 6, wherein the application-usage-pattern dataset comprises one or more of the following types of information:
- a characteristic of a user interface of a first device;
- a usage pattern of the user interface of the first device;
- the classification of the first app;
- an operating feature of the first app on the first device;
- a function of the first app used by the user on the first device;
- an operating feature of the first app on a second device;
- a function of the first app used by the user on the second device;
- a first interaction between the first app on the first device, and the first app on the second device;
- a second interaction between the first app on the first device, and the second app on the first device; and
- a third interaction between the first app on the first device, and the second app on the second device.

8. The computer program product of claim 6, wherein the new-app dataset comprises one or more of the following types of information:
- a user interface characteristic of the new app;
- an operating feature of the new app;
- a function of the new app;
- the classification of the new app;
- a type of device on which the new app is designed to operate; and
- a type of application with which the new app is designed to interact.

9. The computer program product of claim 7, wherein the characteristic of the user interface of the first device includes at least one of the following characteristics:
- a maximum display screen resolution;
- a display screen size;
- an input method; and
- an output method.

10. The computer program product of claim 6, wherein the respective functional classifications of the first app, the second app and the new app include one or more of the following functional classifications:
- email; audio communications; video communications; textual communications; navigation; calculation; social networking; search engine; and financial services.

11. A computer system comprising:
- one or more computer processors;
- one or more computer-readable storage media;
- program instructions stored on the computer-readable storage media for execution by at least one of the one or more processors, the program instructions comprising instructions to perform:
  - collecting application usage pattern data with respect to a plurality of applications (apps) including a first app and a second app distributed non-exclusively over a plurality of devices operated by a user where the first app and the second app each has a respective functional classification, to produce an application-usage-pattern dataset;
  - receiving a new-application dataset (a new-app dataset) with respect to a new application (new app) where the new app has a classification;
  - determining at least one similarity between information in the application-usage-pattern dataset and information in the new-app dataset;
  - determining, based at least in part on the at least one similarity, an installation recommendation as to a first set of devices, of the plurality of devices, that the new app should be installed on;
  - sending the installation recommendation to a user interface;
  - receiving a user input; and
  - on condition the user input indicates acceptance of the installation recommendation, installing the new app on the first set of devices.

12. The computer system of claim 11, wherein the application-usage-pattern dataset comprises one or more of the following types of information:
- a characteristic of a user interface of a first device;
- a usage pattern of the user interface of the first device;
- the classification of the first app;
- an operating feature of the first app on the first device;
- a function of the first app used by the user on the first device;
- an operating feature of the first app on a second device;
- a function of the first app used by the user on the second device;
- a first interaction between the first app on the first device, and the first app on the second device;
- a second interaction between the first app on the first device, and the second app on the first device; and a third interaction between the first app on the first device, and the second app on the second device.

13. The computer system of claim 11, wherein the new-app dataset comprises one or more of the following types of information:
   a user interface characteristic of the new app;
   an operating feature of the new app;
   a function of the new app;
   the classification of the new app;
   a type of device on which the new app is designed to operate; and
   a type of application with which the new app is designed to interact.

14. The computer system of claim 12, wherein the characteristic of the user interface of the first device includes at least one of the following characteristics:
   a maximum display screen resolution;
   a display screen size;
   an input method; and
   an output method.

15. The computer system of claim 11, wherein the respective functional classifications of the first app, the second app and the new app include one or more of the following functional classifications:
   email; audio communications; video communications; textual communications; navigation; calculation; social networking; search engine; and financial services.

* * * * *